United States Patent [19]
Hibata

[11] Patent Number: 5,826,813
[45] Date of Patent: Oct. 27, 1998

[54] SEAT BELT RETRACTOR

[75] Inventor: Ganta Hibata, Kanagawa, Japan

[73] Assignee: NSK Ltd., Tokyo, Japan

[21] Appl. No.: 862,266

[22] Filed: May 23, 1997

[30] Foreign Application Priority Data

May 24, 1996 [JP] Japan ................................ 8-151914

[51] Int. Cl.⁶ ...................... B60R 22/405; B60R 22/41
[52] U.S. Cl. .................................. 242/383.1; 242/382.6; 242/383.2; 242/384.1; 242/384.6
[58] Field of Search .......................... 242/383.1, 384.1, 242/382.6, 383.2, 384.6; 280/806; 297/478

[56] References Cited

U.S. PATENT DOCUMENTS

| | | | |
|---|---|---|---|
| 4,560,115 | 12/1985 | Toyama et al. | 242/383.1 |
| 5,482,224 | 1/1996 | Fujimura et al. | 242/383.2 |

FOREIGN PATENT DOCUMENTS 85878  12/1991  Japan .

*Primary Examiner*—John M. Jillions
*Attorney, Agent, or Firm*—Sughrue, Mion, Zinn, Macpeak & Seas, PLLC

[57] ABSTRACT

It is an object to prevent end locking in which a webbing can neither be drawn out nor wound due to erroneous operation of an emergency lock mechanism at the time of retracting a belt. When almost all the webbing 50 is wound, not only a retaining wall 41c of a rotation control disc 41 regulates an engaging catch 26b of a lock arm 26 so that the engaging catch 26b does not move in the direction of engaging with an internal gear 34a of a gear case 34, but also a projection 12 arranged so as to project from a bobbin 3 engages with the lock arm 26 that is unengaged with the internal gear 34a, which in turn blocks a rachet wheel 18 from rotating with a delay with respect to the bobbin 3. As a result, a pole 16 that is operated by the rachet wheel 18 rotating with a delay with respect to the bobbin 3 is held in an inoperative condition in which the pole 16 is not engaged with engaging internal teeth 2.

17 Claims, 15 Drawing Sheets

SEAT BELT RETRACTOR

BACKGROUND OF THE INVENTION

The present invention relates to a seat belt retractor (winding device), and more particularly to an improved seat belt retractor having an emergency lock mechanism.

Conventionally, there has been employed a seat belt device for restraining the occupant or the like in a vehicle to thereby protect the occupant against collision shock. As a seat belt retractor (winding device) for the seat belt device, automatic lock type retractor (ALR) and emergency lock type retractor (ELR) are well known.

In order to overcome the problem that a seat belt restrains a belt wearing occupant excessively and gives him or her a sense of oppression, it is emergency lock retractors that are generally used. That is, an emergency lock retractor is characterized as not only restraining the occupant effectively and safely with an emergency lock mechanism that physically locks the retractor by an inertia sensing means responding to a sudden acceleration, impact, or deceleration, but also reducing the sense of oppression caused by the webbing.

Further, there is a seat belt retractor that is designed to operate an automatic lock mechanism by locking the winding shaft so as not to rotate in the webbing drawing out direction while causing a switching control means to operate the emergency lock mechanism in accordance with the webbing winding condition. Such a seat belt retractor is characterized in that the emergency lock mechanism and the automatic lock mechanism can be switched as necessary in such a manner that the emergency lock mechanism is operated to restrain the body of the occupant and that the automatic lock mechanism is operated to fix a baggage, a child seat, or the like to the seat.

By the way, the emergency lock mechanism of such seat belt retractors may, in some cases, be operated to lock the winding shaft so as not to rotate in the webbing drawing out direction disadvantageously on occasions in which the vehicle requires such emergency operation. That is, if the webbing is completely wound up drastically so as to follow the force of the winding spring from the condition in which all the webbing has been drawn out, the emergency lock mechanism operates due to such impact, so that rotation of the winding shaft in the webbing drawing out direction is locked, so that the winding shaft is not allowed to rotate in the webbing drawing out direction. In addition, since all the webbing has been wound up, the winding shaft is not allowed to rotate in the webbing winding direction, either. Thus, the webbing is neither drawn out nor wound thereafter, encountering the problem of being brought into a so-called "end-locked" condition.

To overcome this problem, a webbing winding device has been disclosed in, e.g., Examined Japanese Utility Model Publication No. Hei. 8-5878. This webbing winding device includes: a lock means that blocks a winding shaft from rotating in the webbing drawing out direction by engaging with the winding shaft; a lock wheel that guides the lock means to a condition in which rotation of the winding shaft is blocked at the time when the lock wheel stops rotating while the lock wheel is rotating so as to follow the rotation of the winding shaft; a lock lever that is disposed so as to be movable to a condition in which the lock lever blocks the lock wheel from rotating by engaging with the lock wheel and to a condition in which the lock lever allows the lock wheel to rotate by moving away from the lock wheel and that stops rotation of the lock wheel so as to be operated by sensing an emergency condition of the vehicle; a switching lever that is disposed so as to be movable to a condition in which the switching lever allows the lock lever to rotate by moving away from the lock lever and to a condition in which the switching lever forcibly operates the lock lever by engaging with the lock lever; a cam plate that rotates in association with the rotation of the winding shaft, switches the switching lever to either one of the two conditions by engaging with the switching lever in accordance with a predetermined amount of the webbing wound or drawn out, and causes the lock lever to forcibly move away from the lock wheel by engaging with the lock lever when almost all the webbing is wound; and a holding member that holds the switching lever in either one of the two conditions by urging the switching lever. The thus constructed webbing winding device operates in either one of functions ELR and ALR when the switching lever is switched between the two conditions.

According to the aforementioned webbing winding device, when almost all the webbing has been wound in the ELR condition, the cam plate engages with the lock lever, so that the lock lever is forcibly moved away from the lock wheel. As a result, even if an impact or the like caused by the winding shaft stopping rotation acts on the lock lever, the lock lever will never stop rotation of the lock wheel. Therefore, rotation of the winding shaft is not blocked unnecessarily, which in turn avoids the inconvenience that the webbing cannot be drawn out.

However, the retractor disclosed in Examined Japanese Utility Model Publication No. Hei. 8-5878 and the like, which is designed so that the lock lever does not stop rotation of the lock wheel by forcibly causing the lock lever to move away from the lock wheel at the time when almost all the webbing has been wound, still disadvantageously allows the lock means itself to engage with the winding shaft to block the winding shaft from rotating in the webbing drawing out direction.

If the winding shaft is brought to a sudden stop after a rapid winding operation, the lock means engages with the winding shaft due to the impact brought about by such sudden stoppage of the winding shaft, which is likely to cause end locking. This is a problem.

SUMMARY OF THE INVENTION

It is an object of the present invention to overcome this problem and to provide a seat belt retractor having an emergency lock mechanism that can prevent end locking in which the webbing is neither drawn out nor wound due to erroneous operation of the emergency lock mechanism at the time of retracting the belt and that can therefore operate reliably.

The above-mentioned object can be achieved by a seat belt retractor having an emergency lock mechanism for locking a winding shaft so as not to rotate in a webbing drawing out direction at the time of an emergency according to an first aspect of the present invention. The seat belt retractor comprising:

a base;

a winding shaft rotatably supported by the base;

a lock mechanism for locking the winding shaft so as not to rotate in the webbing drawing out direction at the time of an emergency, the lock mechanism comprising, a rachet wheel rotatably supported relative to said winding shaft, a lock arm supported by the rachet wheel and movable between a first position engageable with the base and a second position unengageable with the base, and a lock member for blocking the winding shaft from rotating in the webbing drawing out direction by coupling the winding shaft to the base when the rachet wheel rotates relative to the winding shaft; and regulating members for blocking the lock arm located on the second position from moving to the first position by engaging with the lock arm when the webbing is wound around the winding shaft by a predetermined amount or more.

The above-mentioned seat belt retractor may further comprise an inertia member for causing the lock arm to move to the first position when the inertia member rotates relative to the rachet wheel.

The above-mentioned seat belt retractor may further comprise:

a gear case attached to the base and having internal gears, wherein the lock arm engages the internal gears at the first position.

In the above-mentioned seat belt retractor, the regulating members may comprise:

a retaining wall for holding the lock arm at the second position by engaging with part of the lock arm, when the webbing has been wound by a predetermined amount, in which the retaining wall is movable relative to the rachet wheel in a rotational direction so as to follow the rotation of the winding shaft.

In the above-mentioned seat belt retractor, the regulating members may comprise:

a drive side gear rotating integrally with the winding shaft and having teeth around an outer circumference thereof;

a rotation control disc having the same pitch diameter as the drive side gear and teeth around an outer circumference thereof and being rotatably supported so as to be concentric with the drive side gear, the teeth of the rotation control disc being different in number from the teeth of the drive side gear; and an intermediate gear rotatably supported so as to simultaneously mesh with both of the teeth of the drive side gear and the teeth of the rotation control disc and causing the rotation control disc to rotate out of phase with the drive side gear so as to follow the rotation of the drive side gear, in which the retaining wall is disposed on the rotation control disc.

In the above-mentioned seat belt retractor, the drive side gear and the rotation control disc may be concentric with the winding shaft.

In addition, the above-mentioned object can be achieved by a seat belt retractor having an emergency lock mechanism for locking a winding shaft so as not to rotate in a webbing drawing out direction at the time of an emergency according to a second aspect of the present invention. The seat belt retractor comprising:

a base;

a winding shaft rotatably supported by the base;

a lock mechanism for locking the winding shaft so as not to rotate in a webbing drawing out direction, the lock mechanism comprising, a rachet wheel rotatably supported relative to said winding shaft, a lock arm supported by the rachet wheel and movable between a first position engageable with the base and a second position unengageable with the base, and a lock member for blocking the winding shaft from rotating in the webbing drawing out direction by coupling the winding shaft to the base when the rachet wheel rotates relative to the winding shaft;

a first regulating member for blocking the lock arm located on the second position from moving to the first position by engaging with the lock arm when the webbing is wound around the winding shaft by a predetermined amount or more; and a second regulating member for blocking the lock arm from rotating relative to the winding shaft by engaging with the lock arm held in second position by the first regulating members.

In the above-mentioned seat belt retractor, the second regulating member may comprise a projection formed on the winding shaft.

In addition, the above-mentioned object can be achieved by a seat belt retractor having an emergency lock mechanism for locking a winding shaft so as not to rotate in a webbing drawing out direction at the time of an emergency according to a third aspect of the present invention. The seat belt retractor comprising:

a base;

a winding shaft rotatably supported by the base;

a lock mechanism for locking the winding shaft so as not to rotate in a webbing drawing out direction, the lock mechanism comprising, a rachet wheel rotatably supported relative to the winding shaft, a lock arm supported by the rachet wheel and movable between a first position engageable with the base and a second position unengageable with the base, and a lock member for blocking the winding shaft from rotating in the webbing drawing out direction by coupling the winding shaft to the base when the rachet wheel rotates relative to the winding shaft;

an acceleration sensor attached to the base for sensing speed change applied to the base, the acceleration sensor having an arm member engageable with the rachet wheel when the acceleration sensor is operated; and a regulating member for blocking the rachet wheel from rotating relative to the winding shaft when the webbing has been wound around the winding shaft by a predetermined amount or more, the regulating member including, a first regulating member for blocking the lock arm from moving to the first position, a second regulating member for blocking the lock arm from rotating relative to the winding shaft by engaging with the lock arm held at the second position by the first regulating member, a third regulating members for blocking the rachet wheel from rotating relative to the winding shaft while coupled to the arm member.

In the above-mentioned seat belt retractor the third regulating members may comprise:

a control plate rotated by the winding shaft through speed reducing gear mechanisms; and a lever member interposed between the control plate and the arm member and being movable between a regulating position where the movement of the arm member is regulated and a non-regulating position where the movement of the arm member is not regulated;

in which the control plate comprises a first cam surface holding the lever member to the first position and a second cam surface holding the lever member to the second position, the lever member being brought in engagement with the first cam surface when the webbing has been wound by a predetermined amount or more.

DETAILED DESCRIPTION OF THE PREFERRED EMBODIMENTS

Figure 1:
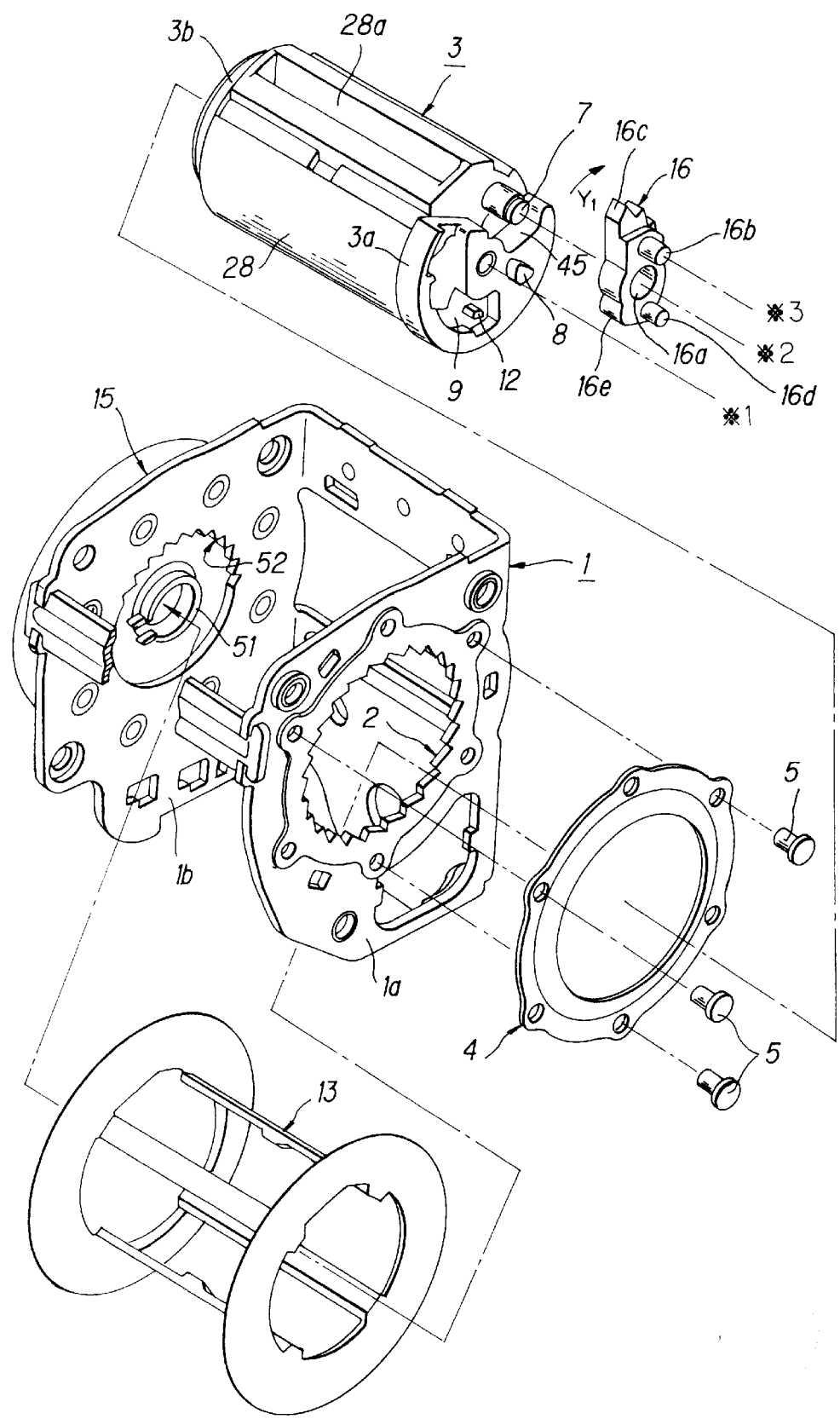
FIG. 1 is a part of an exploded perspective view of a seat belt retractor based on a mode of embodiment of the present invention.

In exploded perspective views and major longitudinal sectional views of a seat belt retractor shown in FIGS. 1 to 4, a retractor base 1 is C-shaped in cross section in the major part thereof, and the confronting side plates 1a, 1b thereof have winding shaft insertion holes formed therein so as to confront each other. A bobbin 3, which is a winding shaft for winding a webbing, is rotatably supported while inserted into these winding shaft insertion holes.

Engaging internal teeth 2 are formed over the inner circumferential edge of the winding shaft insertion hole formed in the side plate 1a, and a ring member 4 is arranged outside the winding shaft insertion hole. The ring member 4 is drawn along the inner circumferential edge thereof, so that when the ring member 4 is fixed to the outer surface of the side plate 1a with rivets 5, a gap is provided in the axial direction between the engaging internal teeth 2 and the inner circumferential edge of the ring member 4, as shown in FIG. 4.

An emergency lock mechanism that blocks the drawing out of the webbing at the time of an emergency is arranged on an end portion of the bobbin 3 that is on the side plate 1a side. Further, a conventional winding spring device 15 is arranged on an end portion of the bobbin 3 on the side plate 1b side, so that the bobbin 3 is urged in a webbing winding direction at all times.

The aforementioned bobbin 3 is a substantially cylindrical winding shaft that is made of an aluminum alloy or the like by integral molding. A slit 28a is formed in a barrel portion 28 of the bobbin 3 around which the webbing is wound. The slit 28a passes through the barrel portion 28 in a radial direction and allows the end portion of the webbing to be held therein. Further, a flange member 13 that is formed as a separate piece is attached to the outer circumferential portion of the bobbin 3 to prevent incorrect winding of the webbing.

Figure 4:
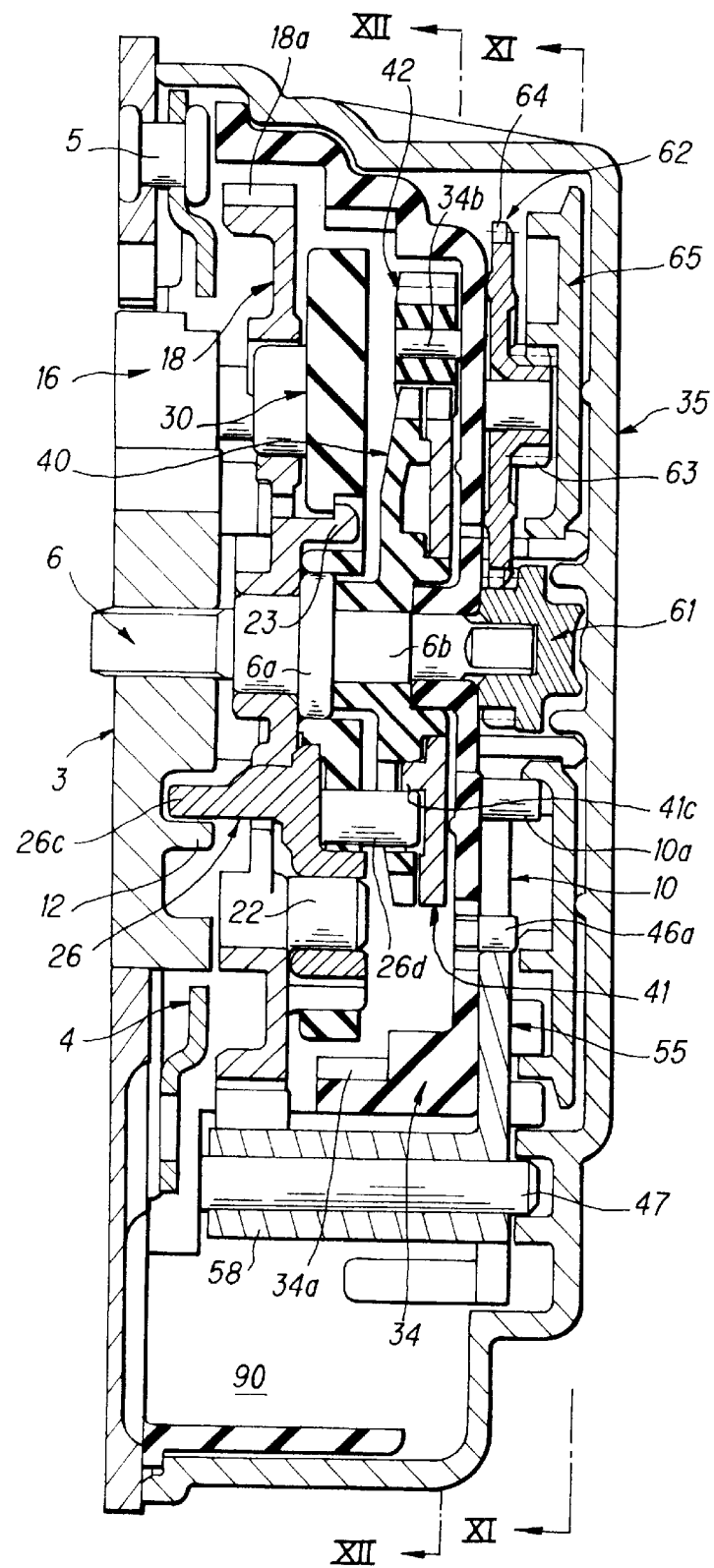
FIG. 4 is a longitudinal sectional view of the seat belt retractor shown in FIGS. 1 to 3.
Figure 5:
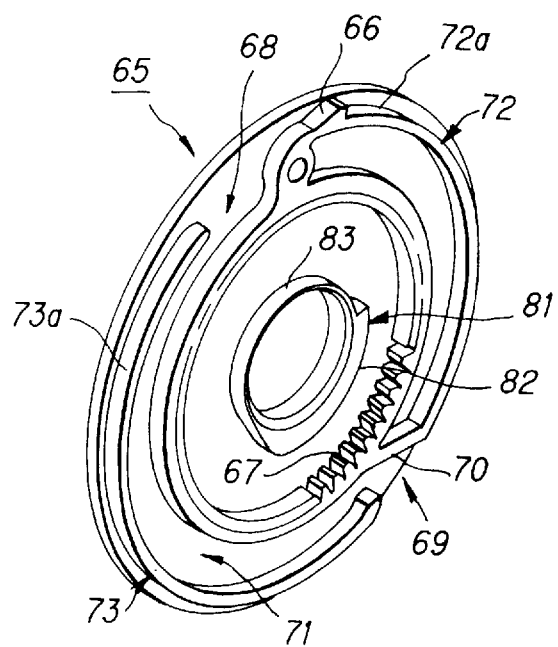
FIG. 5 is a general enlarged perspective view of a control plate shown in FIG. 3.

As shown in FIGS. 1 and 4, a rotating shaft for rotatably supporting the bobbin 3 is arranged so as to project from both end faces of the bobbin 3. In this embodiment, a shaft pin 6 that is formed as a separate piece is screwed to a sensor side end face of the bobbin 3 as a rotating shaft.

Further, a shaft 7 that oscillatably and rotatably supports a pole 16 is arranged so as to project from the sensor side end face of the bobbin 3. The pole 16 is a lock member engageable with the engaging internal teeth 2 arranged on the side plate 1a. Further, a pressure receiving surface 45 is arranged on the sensor side end face of the bobbin 3. The pressure receiving surface 45 not only positions an oscillating side end portion of the pole 16 and a rear end portion 16e of the pole 16 that is opposite to the oscillating side end portion when the pole 16 oscillates in a direction engageable with the engaging internal teeth 2, but also receives a load in cooperation with the engaging internal teeth 2 when such load is applied to the pole 16.

Still further, a retaining projection 8 is arranged on the sensor side end face of the bobbin 3. The retaining projection 8 regulates the counterclockwise rotation of an oscillating lever member 20 that is oscillatably supported by a rachet wheel 18 that will be described later. A recess 9 is provided so that both a tensile coil spring 36 and an arm portion 26c of a lock arm 26 can escape therein so as not to interfere with the bobbin 3. The tensile coil spring 36 rotates and urges the rachet wheel 18 in a webbing drawing out direction (in a direction indicated by the arrow $X_2$ in FIG. 2). The lock arm 26 presses a sensor spring 25 that will be described later. Further, a projection 12 engageable with the front end portion of the arm portion 26c is arranged so as to project from the recess 9. The projection 12 is a regulating member that blocks the rachet wheel 18 from rotating with a delay with respect to the bobbin 3 by engaging with the arm portion 26c of the lock arm 26 unengaged with an internal gear 34a of a gear case 34 that will be described later (see FIG. 7). That is, the projection 12 is designed so as not to engage with the arm portion 26c of the lock arm 26 that has engaged with the internal gear 34a.

Engaging teeth 16c that are engageable with the engaging internal teeth 2 arranged on the side plate 1a are integrally formed on the oscillating end portion of the pole 16. Further, a shaft hole 16a that is rotatably fitted with the shaft 7 with a play is arranged so as to pass through the middle of the pole 16. An engaging projection 16b positioned on the oscillating end side and a pressing projection 16d positioned on the rear end portion 16e side of the pole are arranged so as to project from the sensor side surface of the pole 16.

That is, since the shaft hole 16a is rotatably fitted with the shaft 7 with a play, the pole 16 is supported by the shaft 7 so as to be oscillatably rotatable and relatively movable at a predetermined distance. Further, the front end of the shaft 7 that has passed through the shaft hole 16a of the pole 16 is caulked to a retaining hole 17b of a holding plate 17. The holding plate 17 has the shaft pin 6 that has been screwed to the bobbin 3 inserted into a through hole 17a thereof. As a result of this construction, the holding plate 17 prevents the pole 16 from floating from the end face of the bobbin 3.

The end portion of the engaging projection 16b of the pole 16 is inserted into a cam hole 18a formed in the rachet wheel 18 that is rotatably supported by the shaft pin 6 while arranged outside the hold plate 17.

Under this condition, when the rachet wheel 18 rotates in a webbing winding direction (in a direction indicated by the arrow $X_1$ in FIG. 2) relative to the bobbin 3, the cam hole 18a operates so as to cause the end portion of the engaging projection 16b to move outward in a radial direction from the rotating central axis of the bobbin 3. Therefore, the pole 16 is oscillatably rotated around the shaft 7 in such a direction as to engage with the engaging internal teeth 2 arranged on the side plate 1a (in a direction indicated by the arrow $Y_1$ in FIG. 1).

That is, it is the pole 16 that constitutes a lock member for blocking the bobbin 3 from rotating in the webbing drawing out direction by the engaging teeth 16c of the pole 16 engaging with the engaging internal teeth 2 while oscillatably rotated in the direction of engaging with the engaging internal teeth 2.

Figure 10A:
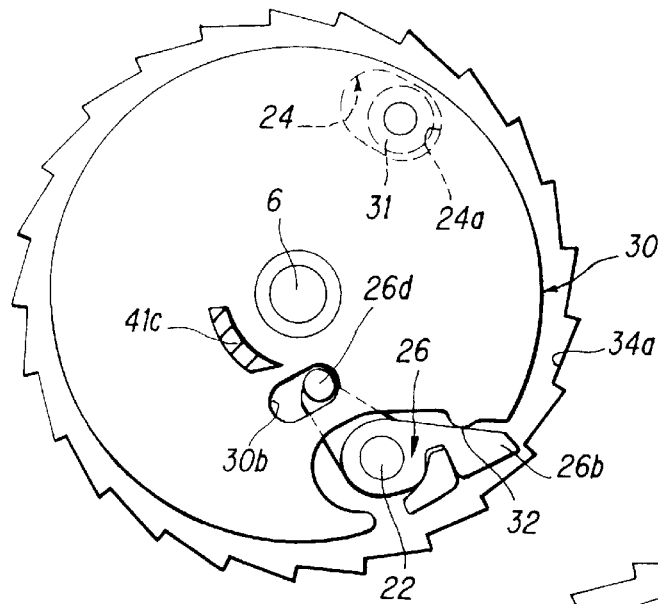
FIGS. 10(a)–(c) are diagrams illustrative of an end lock preventing operation in a webbing acceleration sensing means.
Figure 10B:
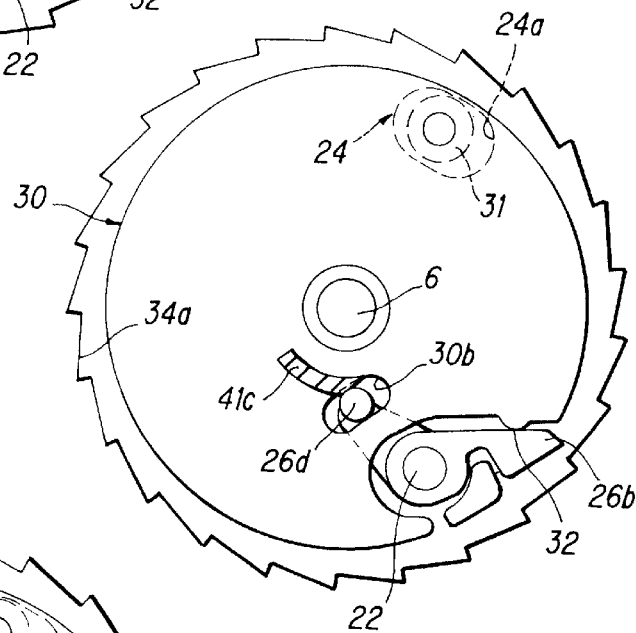
Figure 10C:
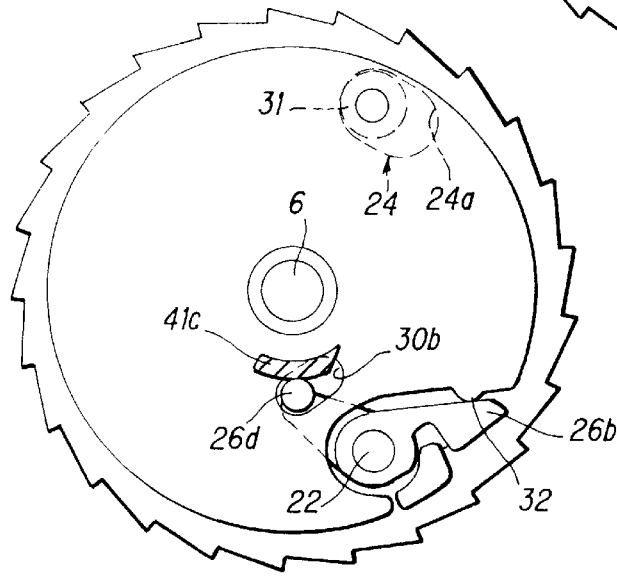

The rachet wheel 18 is a toothed wheel that is rotatably supported by the shaft pin 6 at a central hole thereof, and has rachet teeth 18b formed around the outer circumferential portion thereof. The rachet teeth 18b are engageable with a sensor arm 93 of an automobile body acceleration sensing means 91. Further, the flange portion 6a of the shaft pin 6 supports a central hole 30a of an inertia plate 30 that is a disclike inertia member for constituting a webbing acceleration sensing means that is an inertia sensing means for sensing webbing drawing out acceleration. Retaining catch portions 23 arranged so as to project outward from the retractor from the circumferential edge of a central hole of the rachet wheel 18 positions the inertia plate 30 thrustwise by engaging with engaging holes 33 of the inertia plate 30. An engaging projection 31 of the inertia plate 30 engages with an elongated hole 24 formed in the rachet wheel 18, and an end edge 24a (see FIGS. 10(a)–(c)) of the elongated hole 24 positions the inertia plate 30 in the rotating direction when the emergency lock mechanism is inoperative.

A shaft portion 22 and a holding projection 18e are arranged so as to project from the outer side surface of the rachet wheel 18. The shaft portion 22 rotatably supports the lock arm 26. The holding projection 18e prevents the lock arm 26 from floating. A spring hooking portion 21 is arranged on the inner side surface of the rachet wheel 18. The spring hooking portion 21 hooks an end of the tensile coil spring 36 that has the other end thereof hooked on a hooking portion 17c of the holding plate 17. The tensile coil spring 36 rotates and urges the rachet wheel 18 in the webbing drawing out direction (in the direction indicated by the arrow $X_2$) with respect to the bobbin 3.

The lock arm 26 has an engaging catch 26b, the arm portion 26c, and a retaining projection 26d. The engaging catch 26b is meshable with the internal gear 34a of the gear case 34. The arm portion 26c not only presses the middle portion in the longitudinal direction of the linear sensor spring 25, both ends of which are supported by a pair of hook portions 18d arranged on the outer side surface of the rachet wheel 18, but also is engageable with the projection 12 of the bobbin 3. The retaining projection 26d is engageable with a rotation control disc 41 that will be described later.

The lock arm 26 constitutes a retaining member that blocks the rachet wheel 18 from rotating in the webbing drawing out direction by the engaging catch 26b meshing with the internal gear 34a that is the engaged portion. The engaging catch 26b is urged onto a pressing projection 32 of the inertia plate 30 by the urging force of the sensor spring 25. It may be noted that a hole corresponding to the oscillating range of the arm portion 26c is formed in the rachet wheel 18 and that the arm portion 26c passes through such hole. This arrangement not only ensures engagement of the arm portion 26c with the sensor spring 25, but also allows the arm portion 26c to engage with the projection 12 of the bobbin 3.

Further, an oscillating lever member 20 is oscillatably disposed on a shaft 19 that is arranged so as to project from the inner side surface of the rachet wheel 18. The oscillating lever member 20 has a shaft hole 20a thereof supported by the shaft 19. The oscillating lever member 20 is interposed between the bobbin 3 and the rachet wheel 18 in such a manner that not only the counterclockwise rotation thereof is properly regulated by the retaining projection 8 arranged so as to project from the sensor side end face of the bobbin 3, but also the clockwise rotation thereof is properly regulated by the pressing projection 16d arranged so as to project from the sensor side end face of the pole 16 while coming in contact between the shaft 19 and the retaining projection 8.

A rotation control means is disposed outside the inertia plate 30. The rotation control means includes a drive side gear 40 and the rotation control disc 41. The drive side. gear 40 rotates integrally with the bobbin 3 while fitted with the shaft portion 6b of the shaft pin 6. The rotation control disc 41 is rotatably fitted over a boss portion 40c of the drive side gear 40 with a play so as to overlap on the drive side gear 40.

The rotation control disc 41 has teeth 41a formed around the outer circumference thereof. The teeth 41a are arranged so as to have the same pitch diameter as teeth 40a of the drive side gear 40, but the number of the teeth 41 is different from that of the teeth 40a. An intermediate gear 42 that neighbors the rotation control disc 41 and the drive side gear 40 so as to be meshed with both teeth 40a, 41a simultaneously is rotatably supported by a shaft 34b arranged so as to project from the inner wall of the gear case 34.

That is, if, e.g., the number of teeth of the drive side gear 40 is set to 34 and the number of teeth of the rotation control disc 41 is set to 33 or 35 by subtracting or adding 1 (33 in the mode of embodiment shown in the accompanying drawings), then the rotation control disc 41 driven by the drive side gear 40 through the intermediate gear 42 rotates out of phase with the drive side gear 40 by one tooth (360°/33 teeth=11°) every rotation of the drive side gear 40. It may be noted that a gear having one tooth increased or decreased with the same pitch diameter can be formed easily through proper backlash design or the like.

Figure 7:
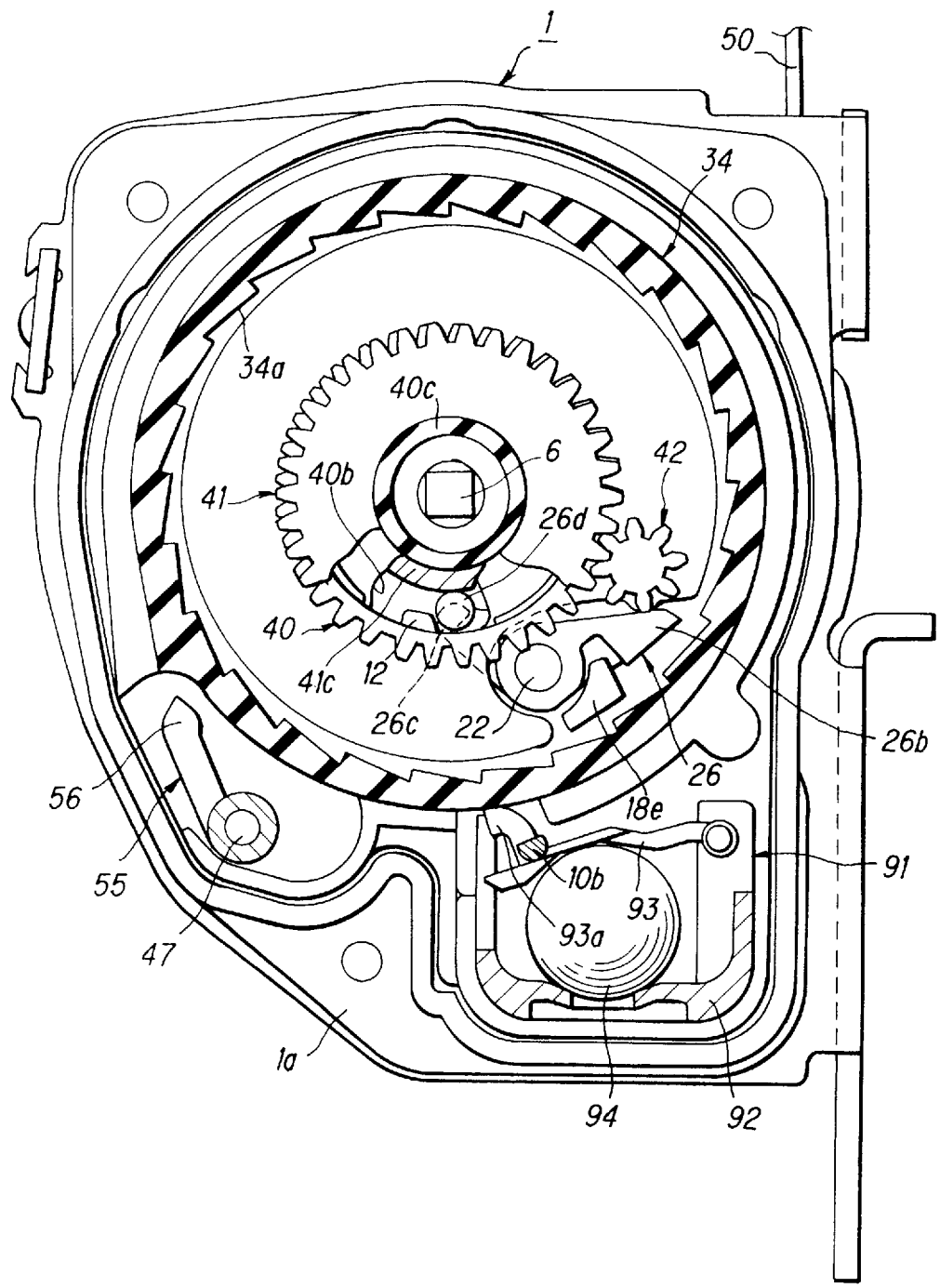
FIG. 7 is a sectional view taken along a line XII—XII of the seat belt retractor shown in FIG. 4.

A retaining wall 41c is arranged so as to project from the side surface of the rotation control disc 41 confronting the drive side gear 40. The retaining wall 41c regulates the lock arm 26 so as not to cause the lock arm 26 to oscillate in the direction of meshing with the internal gear 34a by the retaining wall 41c engaging with the retaining projection 26d while passing through an opening 40b formed in the drive side gear 40, the retaining projection 26d being disposed on the lock arm 26 so as to be engageable with the retaining wall 41c. The rotation control disc 41 is set in such a position as to engage the retaining wall 41c with the retaining projection 26d at the time of winding up all the webbing such as shown in FIG. 7. Therefore, even if the engaging catch 26b of the lock arm 26 tends to oscillate in the direction of engaging with the internal gear 34a of the gear case 34, the lock arm 26 cannot be meshed with the internal gear 34a since the retaining projection 26d cannot be oscillated while regulated by the retaining wall 41c having come in contact with the retaining projection 26d. It may be noted that an elongated hole 30b is formed in the inertia plate 30 so that the retaining projection 26d can pass therethrough without interfering with the inertia plate 30.

Further more, a main gear 61 is fixed to the front end portion of the shaft pin 6 that has passed through the center hole of the gear case 34 arranged outside the rotation control disc 41. A shaft 48, a shaft 44, and a boss wall 49 are arranged so as to project from the outer wall of the gear case 34. The boss wall 49 projects outward from the retractor so as to cover the main gear 61. Not only an idle gear 62 is rotatably supported by the shaft 48, but also an end lock preventing lever 10 is oscillatably supported by the shaft 49. The idle gear 62 meshes with the main gear 61 with a large gear portion 64 passing through a notched portion 49a of the boss wall 49.

Further, a control plate 65 is rotatably supported by the boss wall 49. The control plate 65 rotates with reduced speed with internal teeth 67 thereof meshed with a small gear portion 63 of the idle gear 62. The control plate 65, which constitutes a switching control means together with a lock lever 55 is made of synthetic resin by molding. The lock lever 55, which will be described later, serves as an engageable member. The control plate 65 has, over the inner surface thereof, a control mechanism and an end lock preventing mechanism properly formed. The control mechanism is interposed between the control plate 65 and the lock lever 55 and the end lock preventing mechanism is interposed between the control plate 65 and the end lock preventing lever 10.

The lock lever 55 serving as an engageable member made of synthetic resin is engageably and oscillatably supported by a shaft 47 that is arranged so as to project from the gear case 34. Further, a boxlike containing portion 90 that contains the automobile body acceleration sensing means 91, which is an inertia sensing means for sensing acceleration of an automobile body, is disposed below the gear case 34. A sensor case 92 constituting the automobile body acceleration sensing means 91 is secured to the containing portion 90. The sensor case 92 has, in the hollow interior thereof, a ball weight 94 and a sensor arm 93 disposed. The ball weight 94 is a sensor, and the sensor arm 93 has a projection 93a. The sensor arm 93 is oscillatably disposed. Further, a sensor cover 35 is arranged outside the side plate 1a covering these emergency lock mechanisms.

The lock lever 55 according to this embodiment is substantially the same as "lock lever" in structure, function and operation recited in commonly assigned copending U.S. patent application Ser. No. 08/817,570 filed on Apr. 23, 1997, so more detailed description relating to the lock lever can be found in the copending U.S. Patent Application. The subject matter of the copending U.S. Patent Application is expressively incorporated herein by reference.

Figure 2:
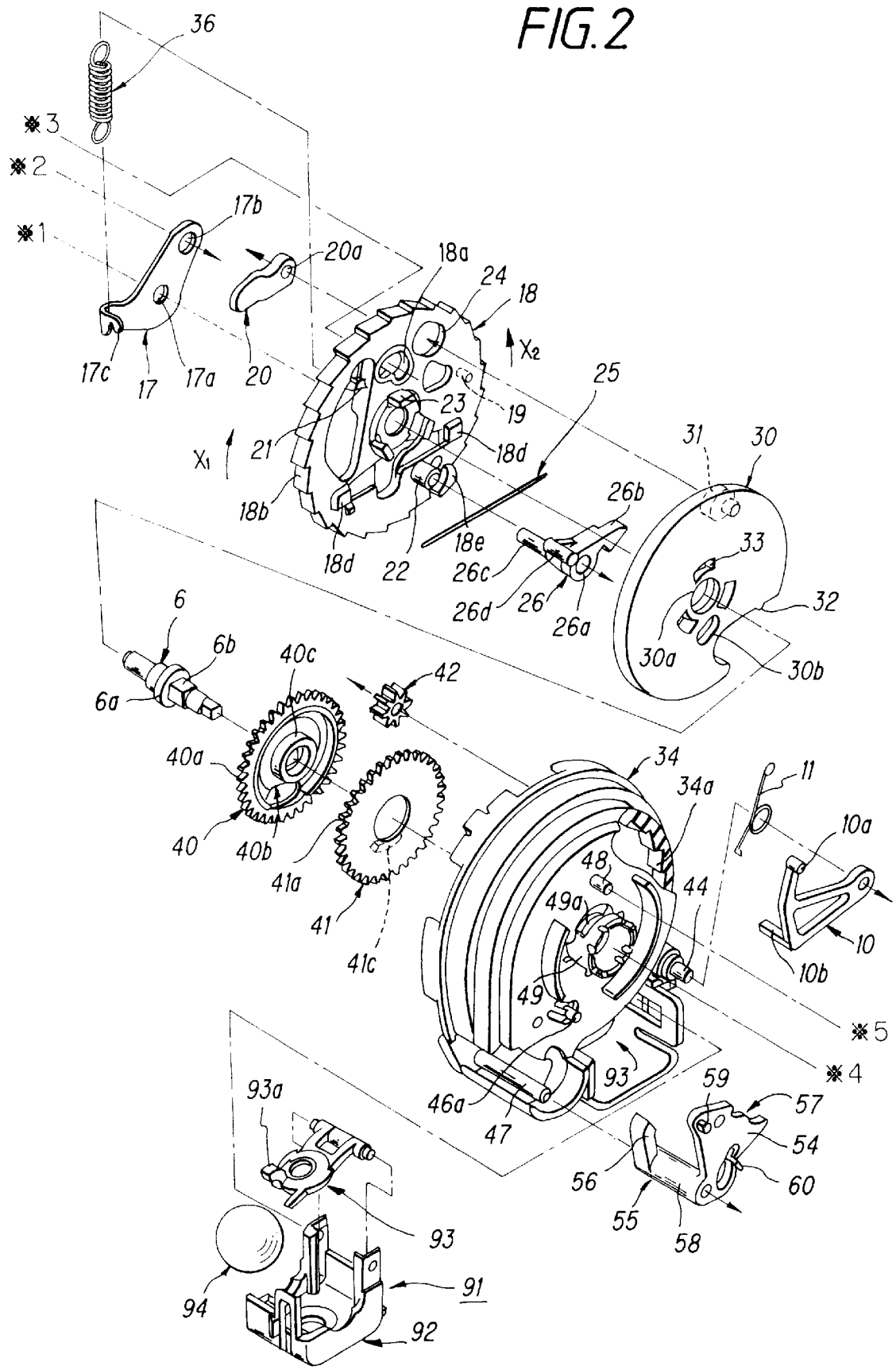
FIG. 2 is a part of an exploded perspective view of a remaining portion of the seat belt retractor shown in FIG. 1.
Figure 3:
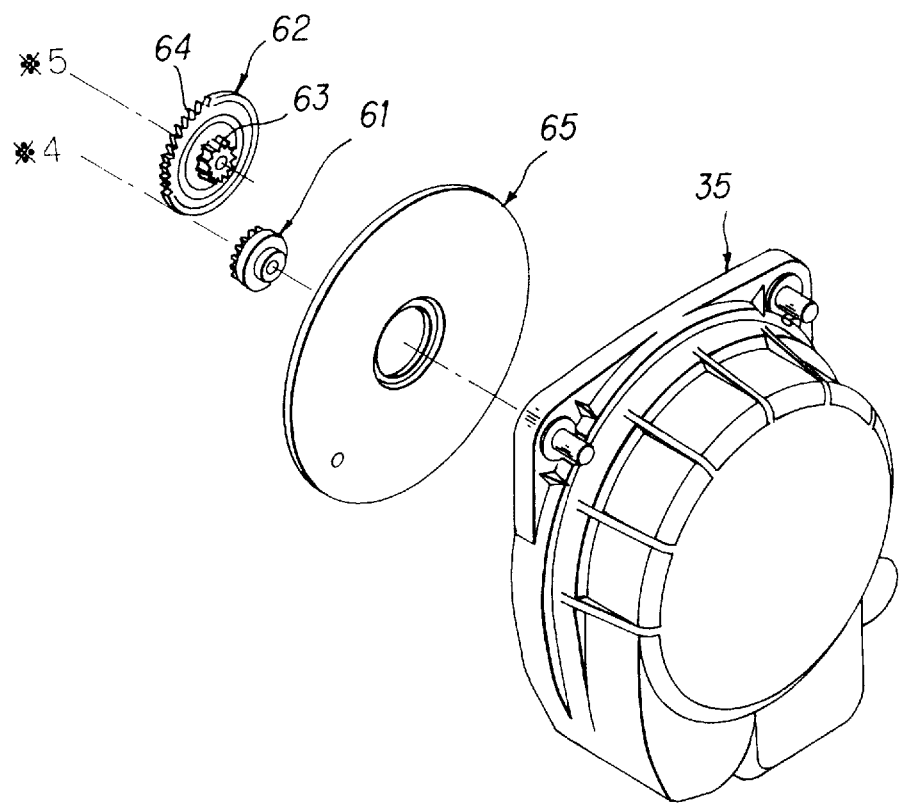
FIG. 3 is a part of an exploded perspective view of a remaining portion of the seat belt retractor shown in FIGS. 1 and 2.
Figure 6:
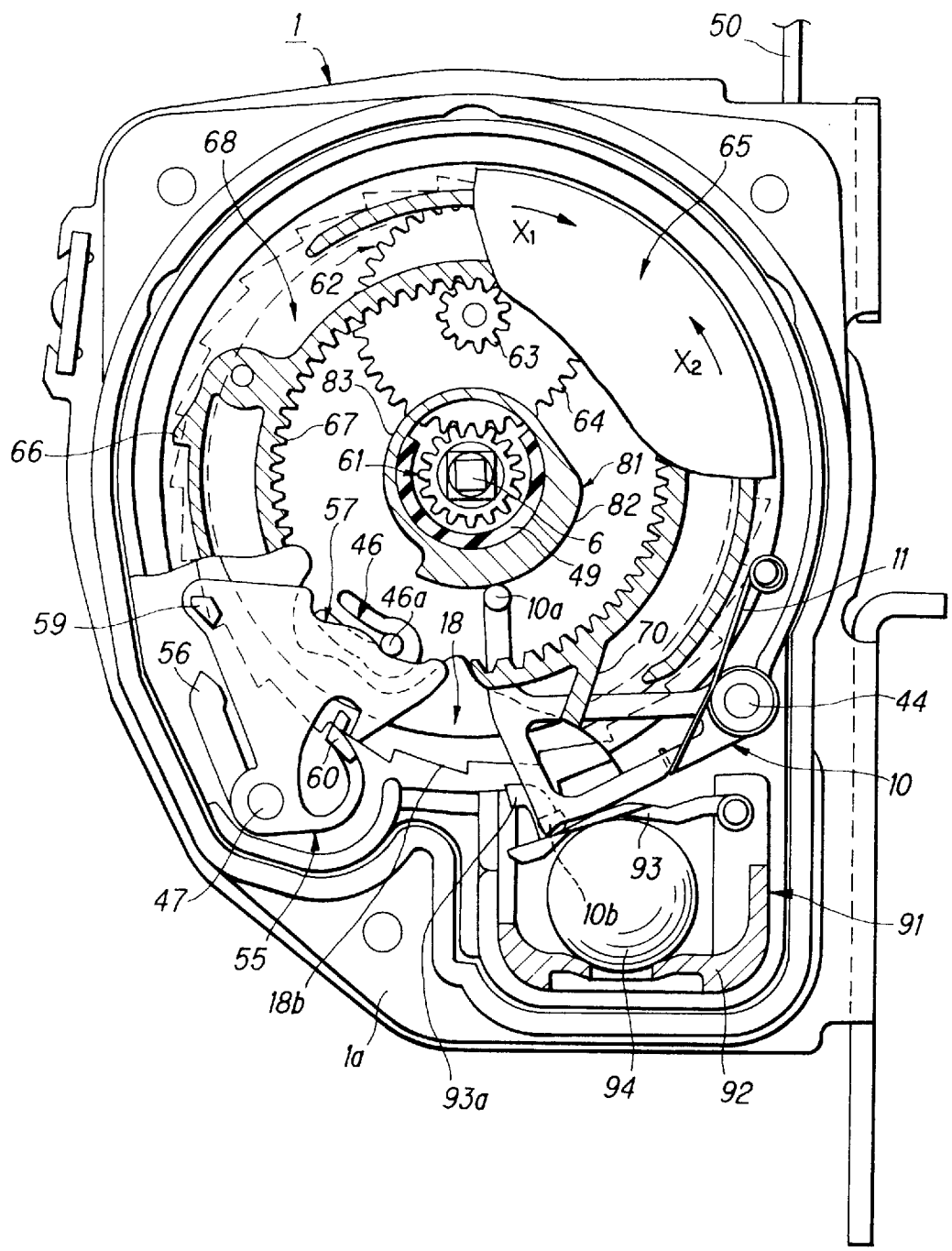
FIG. 6 is a sectional view taken along a line XI—XI of the seat belt retractor shown in FIG. 4.

As shown in FIGS. 2 and 6, the end lock preventing lever 10 includes an engaging projection 10a and a retaining portion 10b. The engaging projection 10a extends sideward from the front end of the oscillating piece of the lock preventing lever 10 so as to engage with the control plate 65. The retaining portion 10b extends sideward from the front end of the oscillating piece so as to engage with the sensor arm 93 of the automobile body acceleration sensing means 91. The end lock preventing lever 10 is urged towards the rotating axis of the bobbin 3 by one end of a torsion coil spring 11 whose other end is hooked to the gear case 34.

The engaging projection 10a engages with a cam surface 81 that constitutes the end lock preventing mechanism of the control plate 65. The end lock preventing lever 10 is oscillated while following the cam surface 81. Further, the retaining portion 10b is positioned above the sensor arm 93, and moves in association with the oscillation of the end lock preventing lever 10 to such a position (see FIG. 6) as to allow the sensor arm 93 to forcibly move away from the rachet wheel 18 by engaging with the sensor arm 93, or to a position unengageable with the sensor arm 93 (see FIG. 11).

Figure 11:
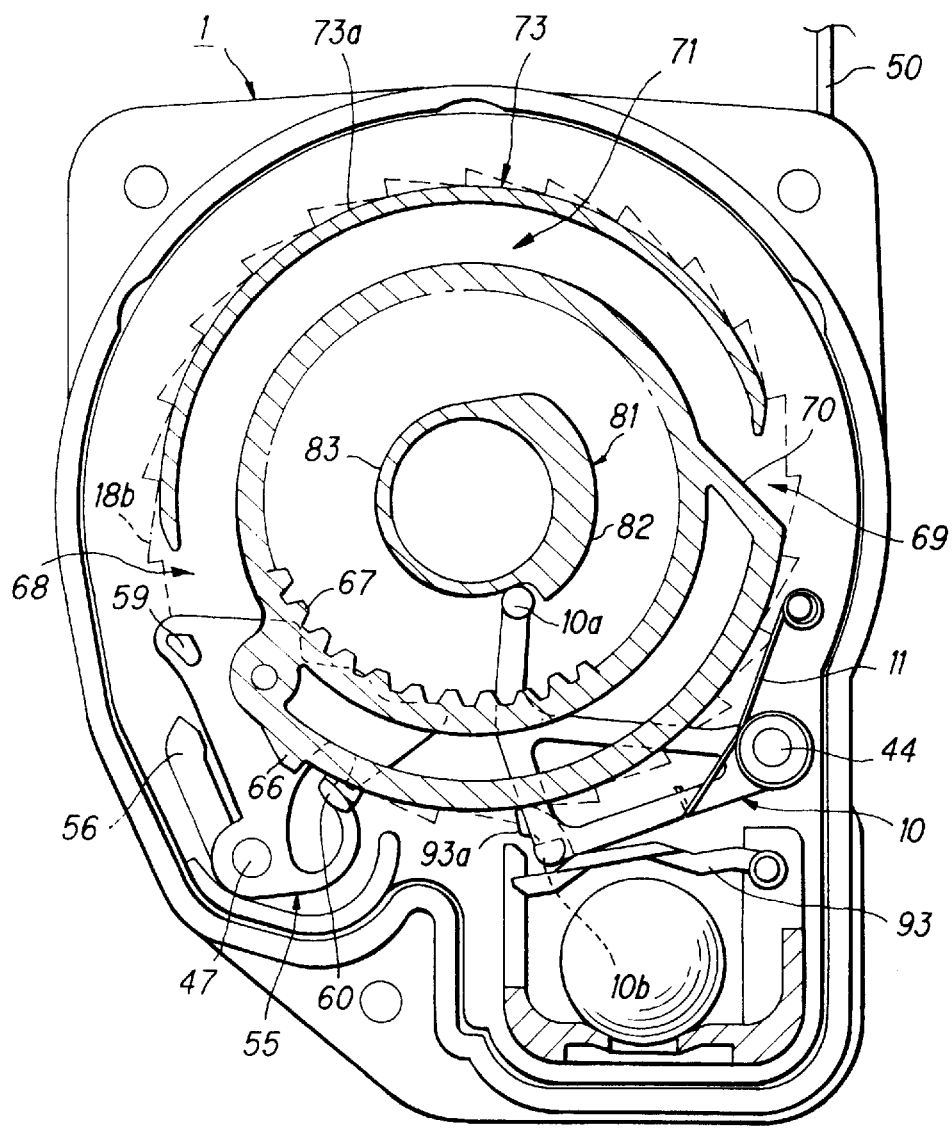
FIG. 11 is an enlarged view of a main portion for explaining the end lock preventing operation and an operation of an automatic lock mechanism in an automobile body acceleration sensing means.

As shown in FIGS. 6 and 11, the end lock preventing mechanism interposed between the control plate 65 and the end lock preventing lever 10 includes a large-diameter cam surface 82, a small-diameter cam surface 83, the end lock preventing lever 10, and the torsion coil spring 11. The large-diameter cam surface 82 holds the sensor arm 93 at such a position that the sensor arm 93 is forcibly moved away from the rachet wheel 18 by allowing the retaining portion 10b to engage with the sensor arm 93 while positioning the engaging projection 10a of the end lock preventing lever 10 close to the outer circumference of the control plate. The small-diameter cam surface 83 holds the retaining portion 10b at the position unengageable with the sensor arm 93 by positioning the engaging projection 10a close to the inner circumference of the control plate.

Then, an operation of the aforementioned seat belt retractor will be described.

Figure 9:
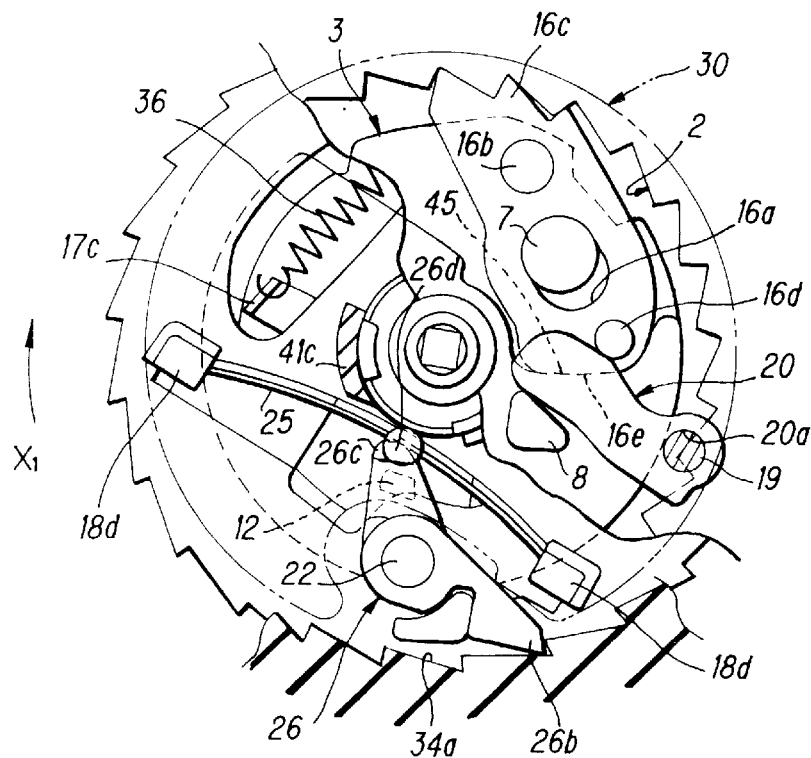
FIG. 9 is a sectional view of a main portion for explaining how the webbing drawing out lock operates.

An operation of the lock arm 26 will be described first. The rotation control disc 41 is set in such a position as to allow the retaining wall 41c to confront the retaining projection 26d of the lock arm 26 at the time of winding up all the webbing as shown in FIGS. 7 and 9. When the bobbin 3 rotates in the webbing drawing out direction with the webbing 50 drawn out by a predetermined amount from the retractor at the time of wearing the seat belt under this condition, the retaining wall 41c moves to such a position as not to confront the retaining projection 26d (see FIG. 9). This is because the rotation control disc 41 is rotated by the drive side gear 40 that rotates together with the bobbin 3 so as to be one tooth ahead every rotation, so that the rotation control disc 41 is out of phase with the lock arm 26 one tooth every rotation of the bobbin 3. It may be noted that the retaining wall 41c can be set to a position completely unengageable with the retaining projection 26d since the bobbin 3 is usually rotating in the webbing drawing out direction for 8 to 15 rotations at the time of wearing the seat belt.

Since oscillation of the retaining projection 26d of the lock arm 26 is not regulated by the retaining projection 26d coming in contact with the retaining wall 41c at the time of using the seat belt, so that the engaging catch 26*b* of the lock arm 26 can move in the direction of engaging with the internal gear 34*a* of the gear case 34. As a result, the lock arm 26 can engage with the gear case 34.

Figure 8:
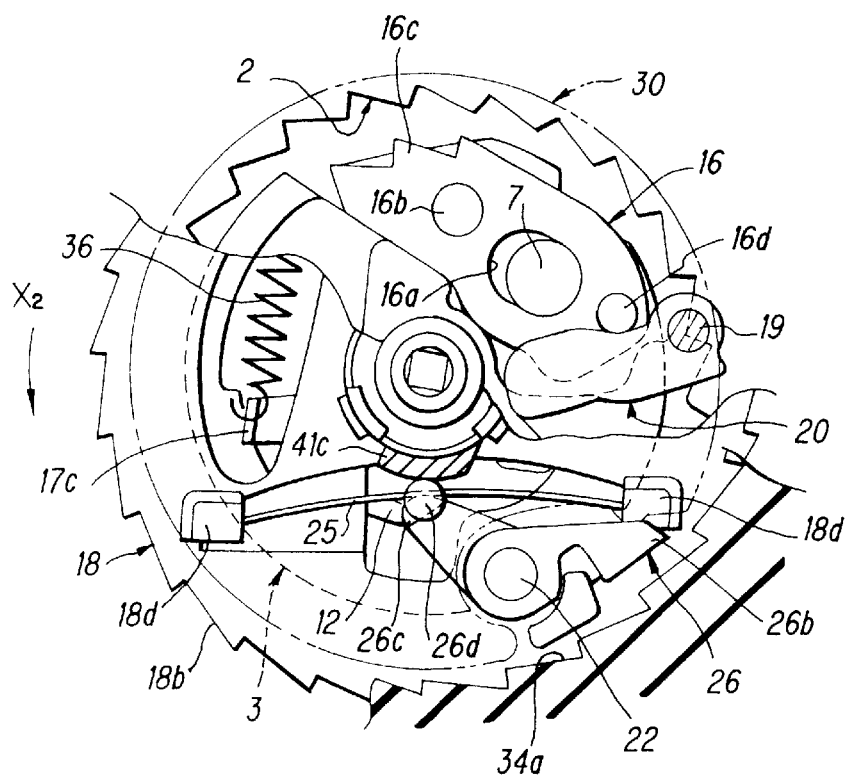
FIG. 8 is a sectional view of a main portion for explaining how a webbing drawing out lock operates.

Further, the engaging catch 26*b* of the lock arm 26 in the webbing acceleration sensing means is urged toward such a position as not to mesh with the internal gear 34*a* of the gear case 34 by the urging force of the sensor spring 25 as shown in FIG. 8. The inertia plate 30 that is urged in the webbing drawing out direction (in the direction indicated by the arrow $X_2$) with respect to the rachet wheel 18 by the engaging catch 26*b* is positioned in the rotating direction with the engaging projection 31 pressed and urged onto the end edge 24*a* of the elongated hole 24. Therefore, the inertia plate 30 rotates integrally with the bobbin 3 through the rachet wheel 18 (see FIG. 10 (*a*)).

Next, an operation of the end lock preventing lever 10 will be described. The engaging projection 10*a* of the end lock preventing lever 10 is positioned on the large-diameter cam surface 82 of the control plate 65 at the time of winding up all the webbing (see FIG. 15). At this time, the retaining portion 10*b* of the end lock preventing lever 10 is held at the position of engaging with the sensor arm 93.

Thus, as shown in FIG. 6, the retaining projection 93*a* of the sensor arm 93 is not engaged with the rachet teeth 18*b* of the rachet wheel 18, and the rachet wheel 18 can therefore be rotated so as to follow the rotation of the bobbin 3.

Figure 12:
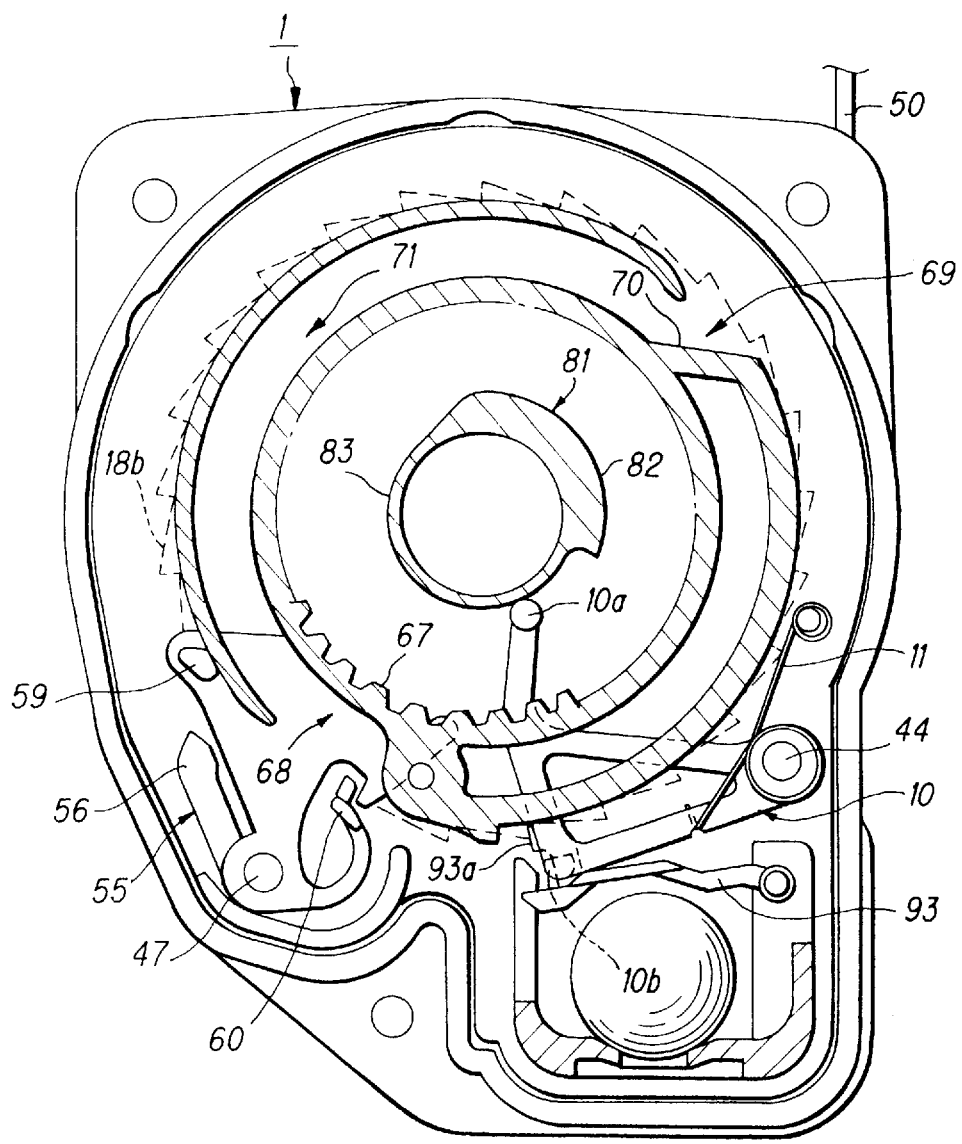
FIG. 12 is an enlarged view of a main portion for explaining the end lock preventing operation and the operation of the automatic lock mechanism in the automobile body acceleration sensing means.
Figure 13:
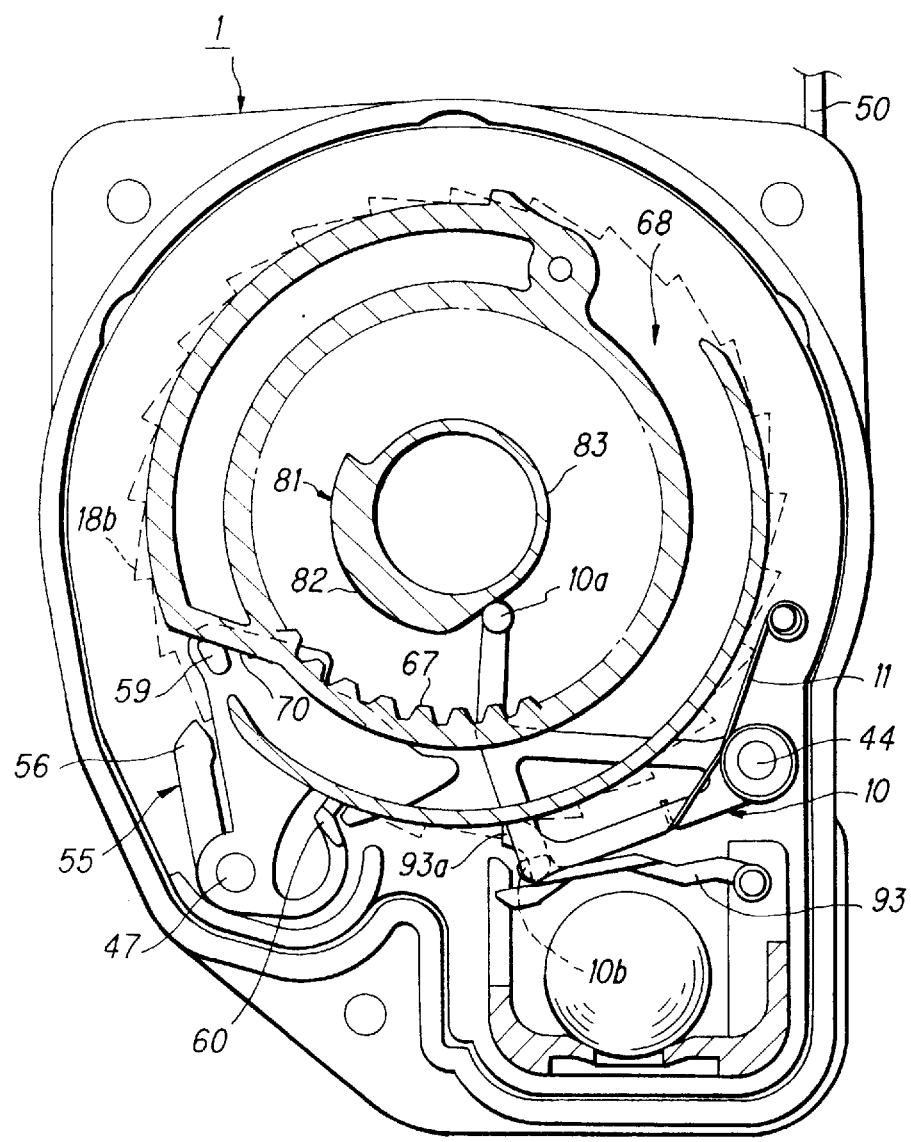
FIG. 13 is an enlarged view of a main portion for explaining the end lock preventing operation and the operation of the automatic lock mechanism in the automobile body acceleration sensing means.
Figure 14:
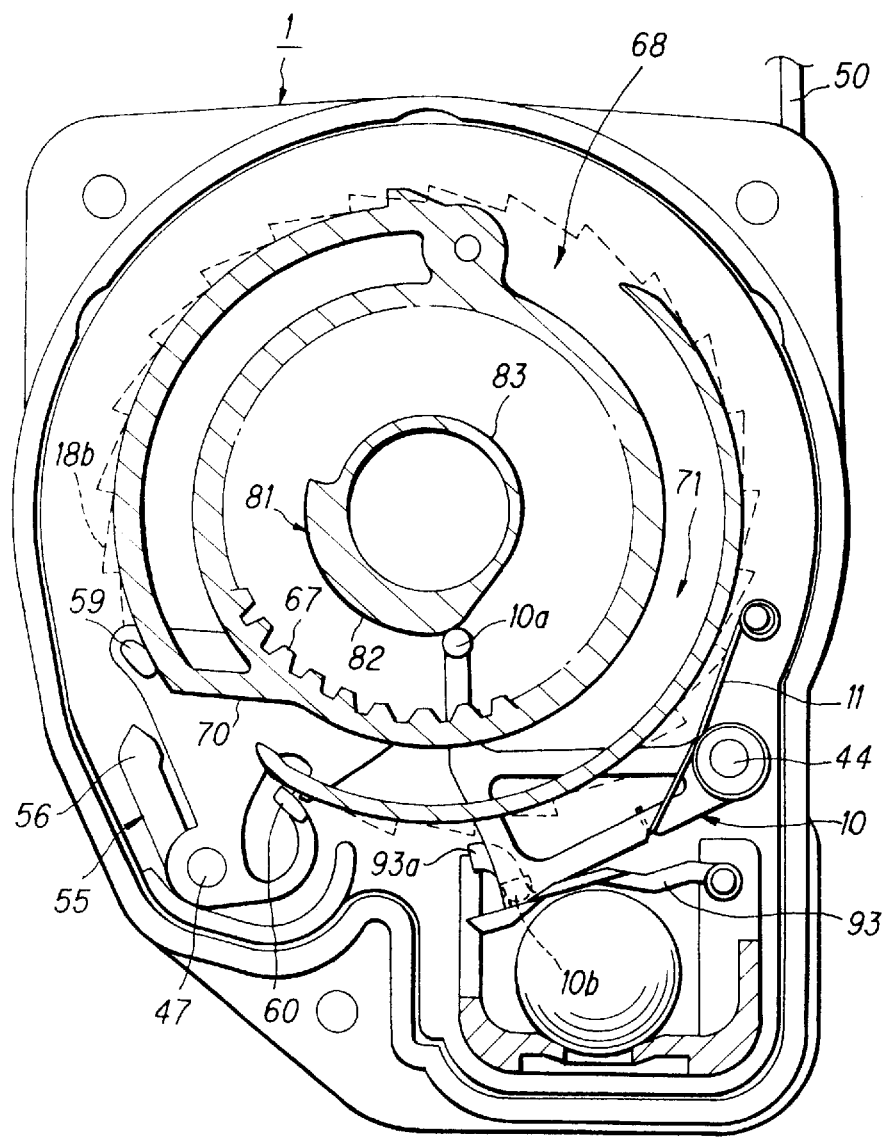
FIG. 14 is an enlarged view of a main portion for explaining the end lock preventing operation and the operation of the automatic lock mechanism in the automobile body acceleration sensing means.

When the bobbin 3 rotates in the webbing drawing outdirection as the webbing 50 is being drawn out by the predetermined amount from the retractor under this condition in order to wear the seat belt, the large-diameter cam surface 82 moves to such a position as not to confront the retaining portion 10*a* (from the condition shown in FIG. 6 to the condition shown in FIG. 11 via the conditions shown in FIGS. 14, 13, and 12).

That is, when the webbing 50 is being drawn out, the bobbin 3 rotates in the direction indicated by the arrow $X_2$, and the main gear 61 fixed to the shaft pin 6 that is fixed to the bobbin 3 starts rotating in the same direction. The control plate 65 rotates in the direction indicated by the arrow $X_1$ with the speed thereof reduced by the idle gear 62, and the large-diameter cam surface 82 formed on the control plate 65 moves in the same direction. When all the webbing has been drawn out, the retaining portion 10*b* is positioned as shown in FIG. 11.

The retractor is designed so that the belt attached condition is set between the position shown in FIG. 13 and the position shown in FIG. 11. While the belt remains attached, the engaging projection 10*a* is kept in contact with the small-diameter cam surface 83 by the urging force of the torsion coil spring 11. Therefore, the retaining portion 10*b* is set to the position unengageable with the sensor arm 93.

Thus, at the time of using the seat belt, the sensor arm 93 can engage with the rachet wheel 18 without allowing the retaining portion 10*b* of the end lock preventing lever 10 to regulate oscillation thereof.

Thus, when the webbing acceleration sensing means or the automobile body acceleration sensing means 91 serving as an inertia sensing means operates in the event of a collision or the like, the sensor arm 93 engages with the rachet wheel 18, or the lock arm 26 engages with the internal gear 34*a* to thereby block the rachet wheel 18 from rotating in the webbing drawing out direction and operate the lock means of the retractor.

When the webbing 50 is further drawn out from the retractor after the automobile body acceleration sensing means 91 or the webbing acceleration sensing means has operated to thereby block the rachet wheel 18 from rotating in the webbing drawing out direction, the rachet wheel 18 rotates with a delay with respect to the bobbin 3 to thereby relatively rotate in the webbing winding direction (in the direction indicated by the arrow $X_1$ in FIG. 2). As a result, the cam hole 18*a* of the rachet wheel 18 causes the engaging projection 16*b* to move from the rotating central axis of the bobbin 3 outward in a radial direction. Hence, the pole 16 is oscillatably rotated around the shaft 7 in the direction of engaging with the internal teeth 2 (in the direction indicated by the arrow $Y_1$ in FIG. 1).

When the webbing 50 is still further drawn out from the retractor, the engaging teeth 16*c* of the pole 16 mesh with the engaging internal teeth 2, so that the meshing operation has been completed. Under this condition, there is a gap between the rear end portion 16*e* of the pole 16 and the pressure receiving surface 45 of the bobbin 3, whereas rotation of the oscillating lever member 20 is regulated by the retaining projection 8 of the bobbin 3 and the pressing projection 16*d* of the pole 16 with little play.

Here, the shaft hole 16*a* of the pole 16 has a play with respect to the shaft 7 of the bobbin 3 and is supported so as to be oscillatably rotatable and relatively movable by a predetermined distance with respect to the bobbin 3. Therefore, when the webbing 50 is still further drawn out from the retractor, the pole 16 rotates relative to the bobbin 3 around the rotating central axis of the bobbin 3 until the rear end portion 16*e* of the pole comes in contact with the pressure receiving surface 45 as shown in FIG. 9.

At this time, while the pressing projection 16*d* of the pole 16 is immovable with respect to the side plate 1*a*, the retaining projection 8 of the bobbin 3 rotates in the webbing drawing out direction (in the direction indicated by the arrow $X_2$). As a result of this movement, the oscillating lever member 20 has the oscillating end portion thereof pressed by the retaining projection 8 with the contact point thereof with the pressing projection 16*d* as a pivot, thereby oscillatably rotating in the clockwise direction as viewed in FIG. 9. When the oscillating lever member 20 has oscillatably rotated in the clockwise direction as viewed in FIG. 9 with the contact point thereof with the pressing projection 16*d* as a pivot, the shaft hole 20*a* supported by the shaft 19 of the rachet wheel 18 comes to rotate in the webbing winding direction (in the direction indicated by the arrow $X_1$) with respect to the rotating central axis of the bobbin 3. As a result, the rachet wheel 18 is rotated reversely in the webbing winding direction (in the direction indicated by the arrow $X_1$) with respect to the bobbin 3.

Therefore, even under the locked condition in which the automobile body acceleration sensing means 91 or the webbing acceleration sensing means operates to cause the locking means of the retractor to block the bobbin 3 from rotating in the webbing drawing out direction, the rachet wheel 18 whose rotation in the webbing drawing out direction is blocked can free the sensor arm 93 in the automobile body acceleration sensing means 91 or the lock arm 26 in the webbing acceleration sensing means so that engagement of the sensor arm 93 or the lock arm 26 with the internal gear 34*a* of the gear case 34 can be released.

When a larger tension is applied to the webbing 50 under the aforementioned condition in which the pole 16 has been locked, both the shaft supporting portion of the gear case 34 and a portion supporting a retainer 51 of the winding spring device 15 are deformed, which in turn causes the bobbin 3 to move upward. This movement is blocked with a contact surface 3a and a groove 3b formed in the bobbin coming in contact with the engaging internal teeth 2 and engaging internal teeth 52, respectively (see FIG. 1). The tension applied to the webbing is thus received by these surfaces.

When the tension applied to the webbing 50 is released as the automobile has stopped, the engagement of the rachet wheel 18 with the sensor arm 93, or the engagement of the lock arm 26 with the internal gear 34a of the gear case 34 is released, which in turn causes the rachet wheel 18 to be rotated in the direction indicated by the arrow $X_2$ with respect to the bobbin 3 by the urging force of the tensile coil spring 36. As a result, the cam hole 18a of the ratchet wheel 18 causes the engaging projection 16b of the pole 16 to gradually move toward the rotating central axis of the bobbin 3. At this time, the tension applied to the webbing 50 in the webbing drawing out direction is released as described above, so that the bobbin 3 is ready to rotate in the webbing winding direction (in the direction indicated by the arrow $X_1$). Therefore, when the bobbin 3 rotates in the direction indicated by the arrow $X_1$ up to the point where the front ends of the engaging teeth 16c of the pole 16 do not interfere with the front ends of the engaging internal teeth 2, the pole 16 is oscillatably rotated around the shaft 7 in such a direction as to release the engagement thereof with the engaging internal teeth 2, which in turn unlocks the bobbin 3. As a result, the webbing can be drawn out freely.

Figure 15:
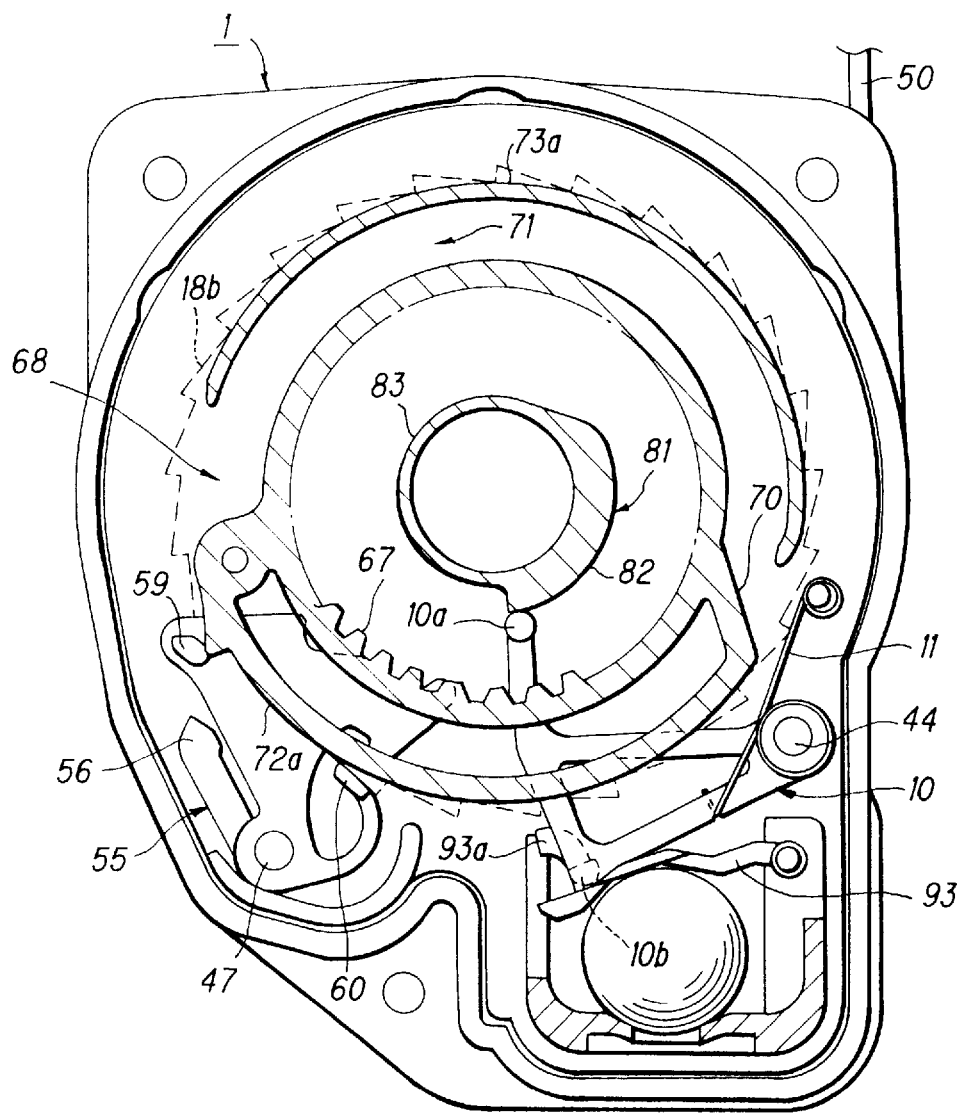
FIG. 15 is an enlarged view of a main portion for explaining the end lock preventing operation and the operation of the automatic lock mechanism in the automobile body acceleration sensing means.

Then, when the webbing 50 is wound and the bobbin 3 rotates in the webbing winding direction, the engaging projection 10a of the end lock preventing lever 10 is positioned on the large-diameter cam surface 82 of the control plate 65 until all the webbing is wound up as shown in FIGS. 14 and 15. Thus, the sensor arm 93 is pressed downward by the retaining portion 10b to be inoperable.

That is, even if the retaining projection 93a of the sensor arm 93 tends to oscillate in such a direction as to engage with the rachet teeth 18b of the rachet wheel 18 when all the webbing 50 has been wound up drastically so as to follow the spring force of the winding spring device 15 from the condition in which the webbing has been drawn out, the large-diameter cam surface 82 of the control plate 65 holds the end lock preventing lever 10 pressed downward as shown in FIG. 15. Thus, the sensor arm 93 is not allowed to engage with the rachet wheel 18. Therefore, the rotation of the bobbin 3 in the webbing drawing out direction is not locked by the automobile body acceleration sensing means 91, which in turn excludes the possibility that the bobbin 3 will be brought into a so-called "end-locked" condition in which the webbing can neither be drawn out nor wound.

On the other hand, when the bobbin 3 rotates in the webbing winding direction so as to follow the spring force of the winding spring device 15 from the condition in which the webbing has been drawn out, the rotation control disc 41 rotates one tooth ahead every rotation thereof by the drive side gear 40 that rotates together with the bobbin 3. As a result, the retaining wall 41c comes in contact with the retaining projection 26d of the lock arm 26 and returns to such a position as to regulate oscillation of the retaining projection 26d when almost all the webbing 50 has been wound as shown in FIG. 10 (c).

Therefore, even if the retaining projection 26d of the lock arm 26 tends to engage with the internal gear 34a of the gear case 34 due to an impact applied when all the webbing has been wound up drastically so as to follow the spring force of the winding spring device 15 from the condition in which the webbing has been drawn out, oscillation of the retaining projection 26d is regulated with the retaining projection 26d having come in contact with the retaining wall 41c and, at the same time, displacement of the inertia plate 30 relative to the rachet wheel 18 is blocked as well. As a result, the lock arm 26 cannot engage with the internal gear 34a.

That is, the rotation control disc 41 senses the amount of webbing wound, and when almost all the webbing 50 has been wound, the retaining wall 41c regulates movement of the retaining projection 26d by coming in contact with the retaining projection 26d so that the lock arm 26 cannot move in the direction of engaging with the rachet wheel 18.

Further, as shown in FIG. 7, the arm portion 26c of the lock arm 26 not engaged with the internal gear 34a blocks the rachet wheel 18 from rotating with a delay with respect to the bobbin 3 by engaging with the projection 12 that is arranged on the bobbin 3. Thus, even if the pole 16 tends to oscillate in the direction of engaging with the engaging internal teeth 2 due to an impact applied when all the webbing has been wound up, the pole 16 is held at a position unengageable with the engaging internal teeth 2 since the rachet wheel 18 is not allowed to rotate with a delay with respect to the bobbin 3.

Therefore, rotation of the bobbin 3 in the webbing drawing out direction is not locked even by the webbing acceleration sensing means, which in turn excludes the likelihood that the bobbin 3 will be brought into the so-called "end-locked" condition in which the webbing is neither drawn out nor wound. The end lock preventing mechanism in the webbing acceleration sensing means in particular can hold not only the rotation of the inertia plate 30 and the lock arm 26 in the nonlocking direction, but also the pole 16 in the position unengageable with the engaging internal teeth 2.

That is, the seat belt retractor according to the aforementioned mode of embodiment holds all the lock mechanisms including the sensor arm 93 in the automobile body acceleration sensing means 91, the inertia plate 30 and the lock arm 26 in the webbing acceleration sensing means, and the pole 16 in the locking means in the nonlocking direction when all the webbing 50 has been wound up. Therefore, end locking can be perfectly avoided.

Figure 16:
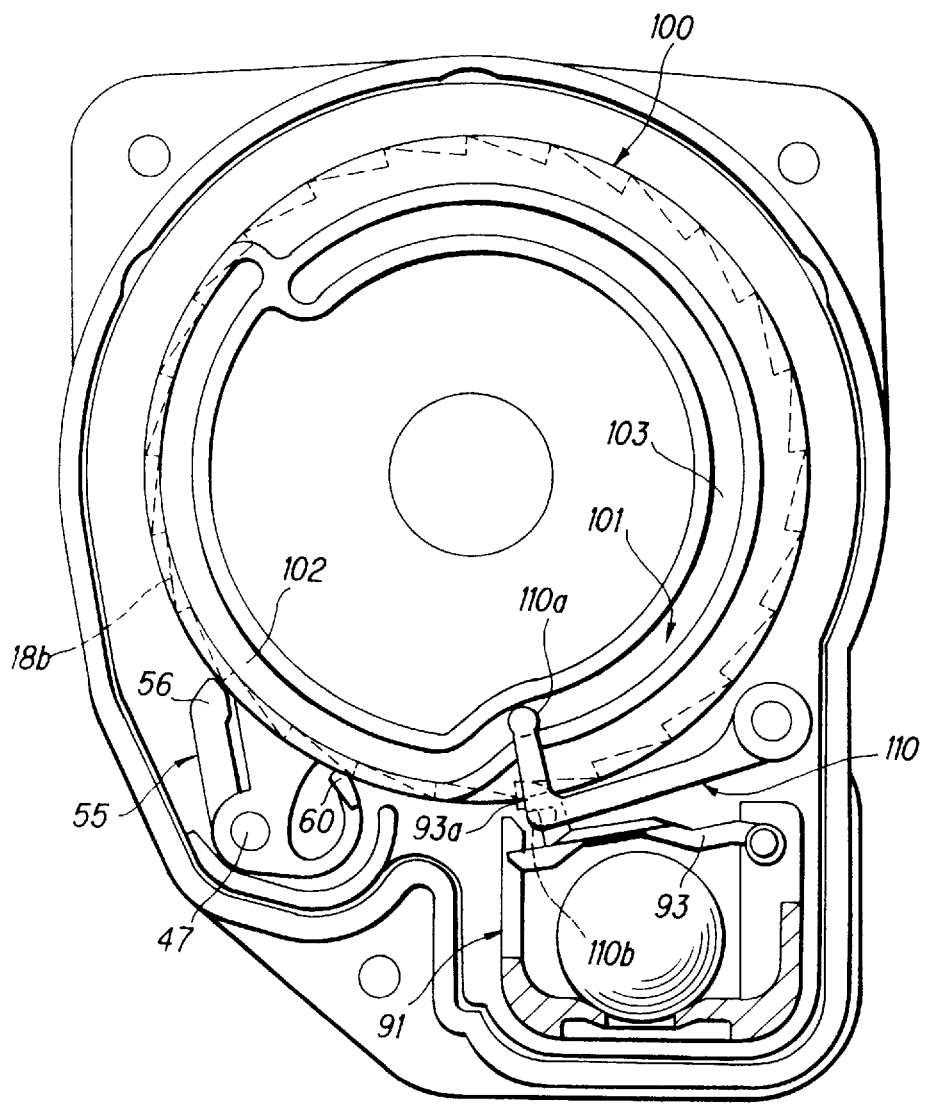
FIG. 16 is a sectional view showing a main portion of a modified example of a control plate shown in FIG. 6. A mode of embodiment of the present invention will now be described in detail with reference to the accompanying drawings.

FIG. 16 is a sectional view showing a main portion of a modified example of an end lock preventing mechanism interposed between the control plate 65 and the end lock preventing lever 10 according to the aforementioned mode of embodiment. This modified example is the same as the seat belt retractor according to the aforementioned mode of embodiment except that a control plate 100 and an end lock preventing lever 110 are employed in place of the control plate 65 and the end lock preventing lever 10.

The control plate 100 is made of synthetic resin by molding, and has a cam surface and a cam groove 101 formed properly on the inner surface thereof and on the outer surface thereof, respectively, similarly to the control plate 65 in the aforementioned mode of embodiment. The cam surface constitutes a control mechanism that is interposed between the control plate 110 and the lock lever 55. The cam groove 101 constitutes the end lock preventing mechanism that is interposed between the control plate 100 and the end lock preventing lever 110.

As shown in FIG. 16, the cam groove 101 is formed of a pair of circumferential walls extending sideward from the outer surface of the control plate 100, and has a large-diameter cam groove 102 and a small-diameter cam groove 103. The large-diameter cam groove 102 holds the sensor arm 93 at such a position that the sensor arm 93 is forcibly moved away from the rachet wheel 18 by allowing a retaining portion 110b to engage with the sensor arm 93 while positioning an engaging projection 110a of the end lock preventing lever 110 on the outer circumferential side of the control plate. The small-diameter cam groove 103 holds the retaining portion 110b at a position unengageable with the sensor arm 93 by positioning the engaging projection 110a on the inner circumferential side of the control plate.

In this case, movement of the end lock preventing lever 110 is controlled by the cam groove 101. Therefore, an urging means such as the torsion coil spring 11 that is employed in the aforementioned mode of embodiment can be dispensed with. It may be noted that other aspects of operation and effects of this modified example are the same as those of the seat belt retractor according to the aforementioned mode of embodiment.

While the emergency lock mechanism of such a type that not only the webbing acceleration sensing means but also the automobile body acceleration sensing means are arranged has been described in the seat belt retractor according to the aforementioned mode of embodiment, a retractor design having an emergency lock mechanism of such a type that only the webbing acceleration sensing means is arranged can, of course, be selected as the seat belt retractor of the present invention.

While the lock means, the latch members, the retaining members, the inertia body, the rotation control means, the regulating means, and the like in the present invention are not limited to those employed in the aforementioned mode of embodiment, but may be modified in various modes. For example, the rotation control disc 41 constituting the rotation control means may be rotated in association with the rotation of the winding shaft through an ordinary reducing gear instead of being rotated through the reducing mechanism that includes the drive side gear 40 and the intermediate gear 42 as in the aforementioned mode of embodiment.

That is, according to the seat belt retractor of the present invention, not only a rotation control means regulates a retaining member so as not to move in the direction of engaging an engaged portion when all the webbing is nearly wound, but also a regulating means engages with the retaining member that is in a position unengageable with the engaged portion, whereby a latch member is not allowed to rotate with a delay with respect to a winding shaft. As a result, a lock means that is operated with the latch member rotating with a delay with respect to the winding shaft can be held inoperative.

That is, when almost all the webbing has been wound, an inertia member, the retaining member, and the lock member can be held inoperative, so that there is no likelihood that the webbing cannot be drawn out due to an emergency lock mechanism erroneously operating at the time of retracting the belt.

Therefore, the present invention can provide a seat belt retractor having an emergency lock mechanism that can prevent end locking in which the webbing can neither be drawn out nor wound due to the emergency lock mechanism erroneously operating at the time of retracting the belt and that can therefore operate reliably.

What is claimed is:

1. A seat belt retractor having an emergency lock mechanism for locking a winding shaft so as not to rotate in a webbing drawing out direction at the time of an emergency, comprising:

a base;

a winding shaft rotatably supported by said base;

a lock mechanism for locking the winding shaft so as not to rotate in the webbing drawing out direction at the time of an emergency, said lock mechanism comprising, a rachet wheel rotatably supported relative to said winding shaft, a lock arm supported by the rachet wheel and movable between a first position engageable with said base and a second position unengageable with said base, and a lock member for blocking the winding shaft from rotating in the webbing drawing out direction by coupling said winding shaft to said base when said rachet wheel rotates relative to said winding shaft; and regulating members for blocking said lock arm located at said second position from moving to said first position by engaging with said lock arm when said webbing is wound around said winding shaft by a predetermined amount or more.

2. A seat belt retractor according to claim 1, further comprising an inertia member for causing said lock arm to move to said first position when said inertia member rotates relative to said rachet wheel.

3. A seat belt retractor according to claim 1, further comprising:

a gear case attached to said base and having internal gears, wherein said lock arm engages said internal gears at said first position.

4. A seat belt retractor according to claim 1, wherein said regulating members comprises:

a retaining wall for holding said lock arm at said second position by engaging with part of said lock arm, when said webbing has been wound by a predetermined amount, in which said retaining wall is movable relative to said rachet wheel in a rotational direction so as to follow the rotation of said winding shaft.

5. A seat belt retractor according to claim 4, wherein said regulating members comprise:

a drive side gear rotating integrally with said winding shaft and having teeth around an outer circumference thereof;

a rotation control disc having the same pitch diameter as said drive side gear and teeth around an outer circumference thereof and being rotatably supported so as to be concentric with said drive side gear, said teeth of said rotation control disc being different in number from said teeth of said drive side gear; and an intermediate gear rotatably supported so as to simultaneously mesh with both of said teeth of said drive side gear and said teeth of said rotation control disc and causing the rotation control disc to rotate out of phase with said drive side gear so as to follow the rotation of said drive side gear, in which said retaining wall is disposed on said rotation control disc.

6. A seat belt retractor according to claim 5, wherein said drive side gear and said rotation control disc are concentric with said winding shaft.

7. A seat belt retractor according to claim 1, wherein said regulating members comprise:

a rotation control disc (41) having a retaining wall (41c) for holding said lock arm (26) at said second position when said webbing has been wound by a predetermined amount, in which said rotation control disc (41) is movable relative to said rachet wheel (18) in a rotational direction so as to follow the rotation of said winding shaft.

8. A seat belt retractor according to claim 7, wherein said regulating members further comprise:

a drive side gear (40) rotating integrally with said winding shaft (6) and having teeth (40*a*) around an outer circumference thereof;

said rotation control disc (41) having teeth (41*a*) around an outer circumference thereof and being rotatably supported so as to be concentric with said drive side gear (40), said teeth of said rotation control disc being different in number from said teeth of said drive side gear; and an intermediate gear rotatably supported so as to simultaneously mesh with both of said teeth of said drive side gear and said teeth of said rotation control disc and causing the rotation control disc (41) to rotate out of phase with said drive side gear (40) so as to follow the rotation of said drive side gear.

9. A seat belt retractor according to claim 8, wherein said drive side gear and said rotation control disc are concentric with said winding shaft.

10. A seat belt retractor according to claim 8, further comprising:

a gear case (34) mounted on said base (1), in which said intermediate gear is supported by said gear case (34).

11. A seat belt retractor according to claim 1, wherein said lock member (16) is supported on said winding shaft (3).

12. A seat belt retractor according to claim 1, further comprising:

an acceleration sensor (91) mounted on said base for sensing an acceleration which is subjected to said base, said acceleration sensor (91) including a sensor arm (93) which is engageable with said rachet wheel (18) when said acceleration sensor (91) is operated.

13. A seat belt retractor according to claim 12, wherein said acceleration sensor (91) comprises a ball weight (94) for operating said sensor arm.

14. A seat belt retractor having an emergency lock mechanism for locking a winding shaft so as not to rotate in a webbing drawing out direction at the time of an emergency, comprising:

a base;

a winding shaft rotatably supported by said base;

a lock mechanism for locking said winding shaft so as not to rotate in a webbing drawing out direction, said lock mechanism comprising, a rachet wheel rotatably supported relative to said winding shaft, a lock arm supported by said rachet wheel and movable between a first position engageable with said base and a second position unengageable with said base, and a lock member for blocking said winding shaft from rotating in said webbing drawing out direction by coupling said winding shaft to said base when said rachet wheel rotates relative to said winding shaft;

a first regulating member for blocking said lock arm located at said second position from moving to said first position by engaging with said lock arm when said webbing is wound around said winding shaft by a predetermined amount or more; and a second regulating member for blocking said lock arm from rotating relative to said winding shaft by engaging with said lock arm held in the second position by said first regulating member.

15. A seat belt retractor according to claim 14, wherein said second regulating member comprises a projection formed on said winding shaft.

16. A seat belt retractor having an emergency lock mechanism for locking a winding shaft so as not to rotate in a webbing drawing out direction at the time of an emergency, comprising:

a base;

a winding shaft rotatably supported by said base;

a lock mechanism for locking said winding shaft so as not to rotate in a webbing drawing out direction, said lock mechanism comprising, a rachet wheel rotatably supported relative to said winding shaft, a lock arm supported by said rachet wheel and movable between a first position engageable with said base and a second position unengageable with said base, and a lock member for blocking said winding shaft from rotating in the webbing drawing out direction by coupling said winding shaft to said base when said rachet wheel rotates relative to said winding shaft;

an acceleration sensor attached to said base for sensing speed change applied to said base, said acceleration sensor having an arm member engageable with said rachet wheel when the acceleration sensor is operated; and a regulating member for blocking said rachet wheel from rotating relative to said winding shaft when said webbing has been wound around said winding shaft by a predetermined amount or more, said regulating member including, a first regulating member for blocking said lock arm from moving to said first position, a second regulating member for blocking said lock arm from rotating relative to said winding shaft by engaging with said lock arm held at said second position by said first regulating member, a third regulating member for regulating movement of said arm member.

17. A seat belt retractor according to claim 16, wherein said third regulating member comprises:

a control plate rotated by said winding shaft through speed reducing gear mechanisms; and a lever member interposed between said control plate and said arm member and being movable between a regulating position where the movement of said arm member is regulated and a non-regulating position where the movement of said arm member is not regulated;

in which said control plate comprises a first cam surface holding said lever member to said regulating position and a second cam surface holding said lever member to said non-regulating position, said lever member being brought in to engagement with said first cam surface when said webbing has been wound by a predetermined amount or more.

* * * * *